3,406,161
PROCESS FOR THE MANUFACTURE OF AZO DYESTUFFS USING UREA AS A COUPLING ACCELERATOR
Jacky Dore and Hans Ischer, Basel, Piero Maderni, Binningen, Basel-Land, Lukas Schneider, Basel, and August Schweizer, Muttenz, Basel-Land, Switzerland, assignors to Sandoz Ltd. (also known as Sandoz A.G.), Basel, Switzerland
No Drawing. Filed Aug. 26, 1965, Ser. No. 482,916
Claims priority, application Switzerland, Sept. 4, 1964, 11,554/64
3 Claims. (Cl. 260—145)

ABSTRACT OF THE DISCLOSURE

Urea is a coupling accelerator in the coupling of diazotized amines with coupling components in the manufacture of azo dyes.

---

The manufacture of azo compounds by coupling diazotized amines with coupling components is often performed in the presence of coupling accelerators. The most efficient and most frequently used known coupling accelerators, especially for coupling in an alkaline medium, are pyridine and its derivatives. However, the unpleasant odour developed during their use is most disturbing. The pyridine bases may even cause injury to health. It is therefore necessary to remove them very carefully from the final products.

The present invention is based on the observation that these drawbacks in the manufacture of azo compounds are obviated when urea is used as coupling accelerator.

It is advantageous to work in an aqueous urea solution containing, for example 2% to 80% of urea in the dissolved and possibly partially suspended form.

Inter alia, aminohydroxynaphthalenesulphonic acids such, for example, as 2-amino-5-hydroxynaphthalene-7-sulphonic acid, which are capable of coupling both in ortho-position relatively to the hydroxyl group and in ortho-position relatively to the amino group, can be coupled with diazo compounds of low coupling energy, for example with diazotized 1-amino-2-hydroxynaphthalene-4-sulphonic acid, in a strongly mineral acid solution uniformly in ortho-position relatively to the amino group by working in the presence of urea. The alkaline coupling is likewise accelerated on addition of urea. The alkaline coupling of diazo or diazoazo compounds derived from 1-amino-2-alkoxynaphthalene or from sulphonic acids thereof gave in the past a practically acceptable yield only when carried out in the presence of pyridine.

Apart from its accelerating and stabilizing effect on diazo compounds, the excellent solubilizing property of urea is advantageous since, in processing the resulting azo dyestuffs, it is often possible to remove by-products in a very simple manner, whereas otherwise they could at best only be removed with considerable difficulty. In many cases of the manufacture of azo dyestuffs capable of being coppered, the coppering can be carried out in the coupling mixture containing urea, and in such a case, too, the solubilizing property of urea is a very great advantage; this is especially true when the coppering operation must be accompanied by the splitting of alkoxy groups. In such a case the coppering is substantially accelerated so that it takes less time or can be carried out at a lower temperature, whereby a desirable power economy is achieved.

Urea may be used in various ways, for example it may be dissolved together with the coupling component in, or pasted with, a small amount of water, and then, if desired, in the presence of an organic or inorganic acid or organic or inorganic base, it is brought into contact with the diazonium salt at a temperature ranging from 0° to 80° C. In certain cases special advantages derive from the additional use of other dissolving intermediaries, for example glycols or their ethers, such as ethyleneglycol, propyleneglycol, diethyleneglycol or 2-ethoxyethanol, or of stabilizers for the diazo compound, for example naphthalenesulphonic acids.

The resulting azo dyestuffs or their metal complexes, for example copper, nickel, cobalt or chromium complexes, are precipitated in known manner, for example by salting out, if desired or required after neutralization of their solutions or suspensions, then suctioned off, if required, washed, and dried.

Dyeings produced with the dyestuffs obtained in this manner on leather, wool, silk, synthetic polyamide fibres or on fibres of natural or regenerated cellulose, such as cotton, linen, hemp, viscose rayon and spun rayon, are of particularly bright shade.

Parts and percentages in the following examples are by weight.

EXAMPLE 1

60.8 parts of the monoazo compound, which is obtained by coupling diazotized 2-amino-4-chloro-1,1'-diphenyl ether with 1-amino-3-(4'-methyl)-phenylsulphonyl-aminobenzene-6-sulphonic acid in a weakly alkaline solution, are dissolved with heating in 1000 parts of water, mixed with 11 parts of sodium nitrite, and at 0° C. rendered strongly mineral acid with 85 parts of hydrochloric acid of 30% strength. After stirring for 4 hours, the diazotization is complete. The orange-brown diazo compound is salted out, filtered off and pasted at 0° C. with a small amount of water. This paste (about 200 parts) is rapidly mixed with a suspension of 26.3 parts of 2-amino-8-hydroxynaphthalene-6-sulphonic acid and 220 parts of urea in 100 parts of water, and the mass is immediately heated to 35° C. Coupling in ortho-position relatively to the amino group of the 2-amino-8-hydroxynaphthalene-6-sulphonic acid sets in very quickly and a deep blue solution of the disazo dyestuff formed is obtained. The solution is neutralized with sodium carbonate, heated to 90° C. and the dyestuff is salted out, filtered off and dried at 90° C. under vacuum. The yield of disazo dyestuff is substantially quantitative. Small amounts of yellow and red by-products remain dissolved in the concentrated urea solution and are separated on filtration.

EXAMPLE 2

44.5 parts of the monazo compound, which is obtained by alkaline coupling of diazotized 1-hydroxy-2-amino-6-chlorobenzene-4-sulphonic acid and 1-(4'-amino)-phenyl-3-methyl-5-pyrazolone, are diazotized in the usual manner. The precipitated diazo compound is suctioned off; 28 parts of 2-amino-5-hydroxynaphthalene-7-sulphonic acid are then stirred in a mixture of 150 parts of water, 700 parts of urea and 15 parts of hydrochloric acid of 30% strength and heated to 70° to 75° C., and at this temperature the diazo paste (about 150 parts) is stirred in within 2 hours. Coupling sets in quickly and uniformly in ortho-position relatively to the amino group of the 2-amino-5-hydroxynaphthalene-7-sulphonic acid, and the bulk of the resulting brown-red disazo dyestuff passes into solution. To isolate the dyestuff 900 parts of methanol and 100 parts of hydrochloric acid of 30% strength are added to the coupling mixture, the precipitated dyestuff is filtered off and dried.

EXAMPLE 3

59.7 parts of the disazo compound, which is obtained by tetrazotizing 1 mol of 4,4'-diamino-1,1'-diphenyl and coupling the tetrazo compound with 1 mol of 1-hydroxybenzene-2-carboxylic acid and 1 mol of 1-amino-2-methoxynaphthalene-6-sulphonic acid, are stirred in 600 parts of water and diazotized by adding 7 parts of sodium nitrite and 60 parts of hydrochloric acid of 30% strength. The diazonium salt settles out in the form of brown crystals and is filtered off. 150 parts of urea are then dissolved in 100 parts of water, 40 parts of anhydrous sodium carbonate and 34.8 parts of sodium 1-hydroxynaphthalene-3,6-disulphonate are added, and the diazonium compound (about 200 parts in paste form) is added at 5° to 10° C. to this solution. Coupling sets in quickly, and an olive-green dyestuff forms which passes substantially into solution. On the following day the coupling mixture is heated to 90° to 95° C., a solution of 25 parts of copper sulphate in 50 parts of water and 10 parts of ammonia of 25% strength is added, and the solution is heated for 4 hours at 90° to 95° C. with stirring, during which the trisazo dyestuff undergoes coppering and the methoxy group is split. The coppering solution is diluted with an equal volume of water, and the cupriferous dyestuff is salted out, filtered off and dried. It dyes cotton and fibres from regenerated cellulose olive-green shades which are fast to light and washing.

Dyeing instruction

A dyebath is prepared from 3000 parts of lime-free water and 1 part of the dyestuff described above, and 100 parts of previously wetted cotton are immersed in it at 30° C. The dyebath is heated to the boil within 30 minutes and maintained for 15 minutes at 100° C. During the dyeing operation there are gradually added to the bath 40 parts of calcined sodium sulphate in the form of a concentrated aqueous solution. The dyed cotton is allowed to cool in the bath to 50° C., then taken out, rinsed in distilled water and dried. The particularly bright olive-green shade obtained has good properties of fastness.

Valuable cupriferous trisazo dyestuffs are likewise obtained, when in the above example the 34.8 parts of sodium 1-hydroxynaphthalene-3,6-disulphonate are replaced by an equivalent amount of sodium 1-hydroxynaphthalene-4- or 5-sulphonate, sodium-2-hydroxynaphthalene-4- or 6-sulphonate, sodium 2-hydroxynaphthalene-3,6-disulphonate or sodium 1 - hydroxynaphthalene-3,6,8-trisulphonate.

Practically no coupling at all occurs when the addition of urea is omitted.

EXAMPLE 4

24.4 parts of 4,4'-diamino-3,3'-dimethoxy-1,1'-diphenyl are tetrazotized at 0° C. in 400 parts of water and 58 parts of concentrated hydrochloric acid with a solution of 13.8 parts of sodium nitrite in 45 parts of water. The solution of the tetrazo compound is mixed at 5° C. with 45 parts of sodium naphthalene-2-sulphonate and then, while being stirred, with a solution of 32 parts of 1-hydroxynaphthalene-3,6-disulphonic acid and 10 parts of calcined sodium carbonate in 200 parts of water. 16 parts of calcined sodium carbonate in the form of a concentrated aqueous solution are then added, whereupon the intermediate formed settles out. Without isolating this intermediate, a solution of 74 parts of the dyestuff of the formula

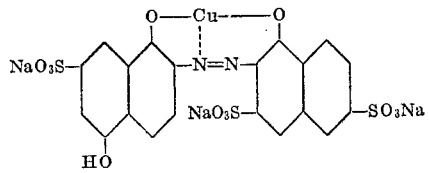

in 250 parts of water, 22 parts of sodium hydroxide solution of 30% strength and 200 parts of urea are added with vigorous stirring. Another 500 parts of urea are then sprinkled in, and the batch is kept for 6 hours at 8° to 10° C. and then for 12 hours at 15° to 20° C.

On completion of the coupling reaction the trisazo dyestuff formed is isolated with heating with the aid of sodium chloride and filtered off. For the demethylating coppering, the filter cake is treated in 2000 parts of water and 80 parts of diethanolamine at a temperature of 95° C. with an ammoniacal copper tetraminesulphate solution (prepared from 50 parts of crystalline copper sulphate) until the demethylation and the coppering are complete. The cupriferous trisazo dyestuff is then salted out with sodium chloride and filtered off. In the dried and ground state it forms a dark, water-soluble powder which dyes cotton and fibers from regenerated cellulose by the dyeing method of Example 3 fast, blue-grey shades.

No useful dyestuff is obtained when the addition of urea to the coupling mixture is omitted.

EXAMPLE 5

26.4 parts of 4,4'-diamino-1,1'-diphenyl-3-sulphonic acid are tetrazotized in 500 parts of water and 60 parts of concentrated hydrochloric acid at 0° to 5° C. by adding a concentrated solution of 13.8 parts of sodium nitrite. 23 parts of concentrated hydrochloric acid and 20 parts of crystalline sodium acetate are then added, and a solution of 43 parts of the disodium salt of 2-acetoacetylamino-naphthalene-5,7-disulphonic acid in 200 parts of water is run in at 5° C., whereupon 60 parts of crystalline sodium acetate are sprinkled over the mixture. When the formation of the intermediate is complete, a solution of 27.4 parts of the sodium salt of 1-amino-2-methoxynaphthalene-6-sulphonic acid in 200 parts of water is added to the reaction mixture which is then stirred at a pH of 4.0 for 4 hours at 5° to 10° C. and then for about 20 hours at room temperature. The resulting aminodisazo dyestuff is neutralized with heating by means of sodium hydroxide solution, filtered off and then stirred with 300 parts of water to form a homogeneous paste (about 500 parts total). 8 parts of sodium nitrite in 12 parts of water and then, at 5° C., 60 parts of concentrated hydrochloric acid are added and the batch is stirring at a strongly acid reaction to Congo red for 5 hours, after which the excess nitrite is decomposed with aminosulphonic acid. The resulting diazodisazo compound is gradually added at 0° to 5° C. to a solution of 17.2 parts of 2-hydroxynaphthalene in 100 parts of water, 16 parts of sodium hydroxide solution of 30% strength and 200 parts of urea. During the addition of the diazo compound another 200 parts of urea and 42 parts of sodium hydroxide solution of 30% strength are added to maintain an alkaline reaction of the batch (pH about 8 to 9). The coupling solution is then stirred for at least 12 hours without cooling it, whereupon the formation of the trisazo dyestuff is complete.

For the demethylating coppering, the dyestuff solution is mixed with 10 parts of calcined sodium carbonate and treated at 95° C. for 10 hours with an ammoniacal copper tetraminesulphate solution prepared from 25 parts of crystalline copper sulphate. The coppered trisazo dyestuff is salted out with sodium chloride and filtered off. In the dry state it is a dark, water-soluble substance which dyes cotton and fibres from regenerated cellulose olive-green shades.

When the urea is omitted, many by-products and decomposition products form during the coupling and these reduce considerably the yield and/or quality of the dyestuff obtained.

EXAMPLE 6

62.7 parts of the disazo dyestuff of the formula

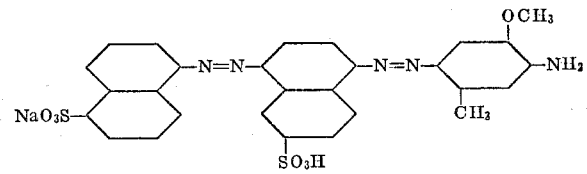

(in the form of the monosodium salt) are dissolved in 400 parts of water at room temperature with addition of 60 parts of 2 N sodium hydroxide solution. The red-brown solution is cooled to 2° to 3° C., 25 parts of sodium chloride are added with vigorous stirring and the mixture is rendered mineral acid with 30 parts of hydrochloric acid of 30% strength. A concentrated aqueous solution of 7 parts of sodium nitrite is then run in within about 10 minutes, while keeping the temperature below 5° C. The dark brown diazo compound settles out quantitatively.

51.4 parts of the monoazo dyestuff of the formula

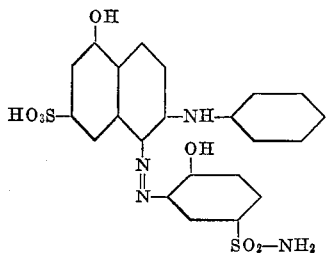

are suspended in 350 parts of water at room temperature and caused to dissolve partly by adding 40 parts of sodium carbonate.

600 parts of urea are added to the above mixture, whereupon the dyestuff dissolves (solution is red) and the temperature drops to a few degrees below zero.

The suspension of the diazo compound prepared as described above is vigorously stirred into the urea solution within about 10 minutes, while providing efficient cooling to prevent the coupling temperature from rising above 5° C. The tetrakisazo dyestuff formed is obtained in colloidal form. The coupling reaction takes 30 to 60 minutes.

To isolate the tetrakisazo dyestuff, the coupling mixture is heated to 90° C., with the dyestuff forming a deep grey-blue solution. On addition of 400 parts of sodium chloride it settles out. The suspension is cooled to 70° C., and the dyestuff is filtered off and washed with sodium chloride solution of 25% strength.

To convert the tetrakisazo dyestuff into its copper complex, the moist filter cake is introduced into 1500 parts of water and heated to 90° C. 100 parts of diethanolamine, 200 parts of ammonium hydroxide solution of 25% strength and a concentrated aqueous solution of 80 parts of crystalline copper sulphate are successively added, and the mixture is stirred for 18 to 24 hours at 93° to 95° C., then allowed to cool to 80° C., and 240 parts of sodium chloride are added. The copper complex settles out quantitatively in pure form, while a small amount of impurities remains dissolved. The whole is filtered and the residue washed with sodium chloride solution of 15% strength. The filter residue is dried at 100° C. and then ground. The dyestuff forms a black powder which forms a bluish grey solution in water and a blue solution in concentrated sulphuric acid.

The dyestuff dyes cellulose fibres by the dyeing method of Example 3 bluish grey shades. The dyeings are very fast to light.

If the coupling is carried out in the absence of urea, no useful tetrakisazo dyestuff is obtained.

EXAMPLE 7

44.2 parts of the disazo dyestuff of the formula

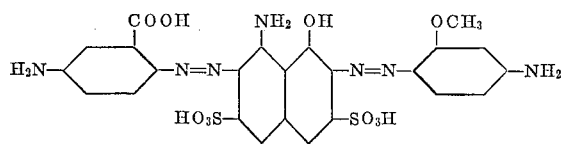

are dissolved at 20° C. in 450 parts of water and 17 parts of anhydrous sodium carbonate. A concentrated solution of 10.5 parts of sodium nitrite is added and the solution dropped at 20° C. into a mixture of 50 parts of water and 65 parts of hydrochloric acid of 30% strength; the whole is stirred to finalize the tetrazotization and the small excess of nitrite is decomposed with aminosulphonic acid.

In a separate operation 48 parts of the compound of the formula

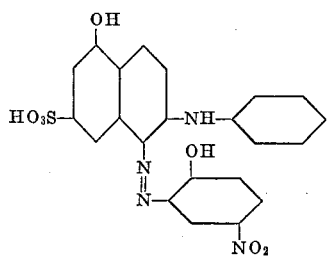

are stirred in 200 parts of water and 60 parts of sodium hydroxide solution of 30% strength until a homogeneous solution has formed. 100 parts of urea are added, the solution is cooled to 0° to 3° C. and the tetrazo suspension is added at 0°. to 5° C., while cooling with ice to keep the temperature below 5° C.

The initially strongly alkaline reaction of the coupling mixture recedes during the addition of the tetrazo suspension. When the pH value has dropped to about 10.2, 20 to 27 parts of sodium hydroxide solution of 30% strength are dropped in so as to maintain the pH value at 10.0 to 10.5. After addition of the tetrazo compound the coupling mixture is stirred for 3 hours at 0° to 5° C. and then overnight at a temperature rising from 5° to 20° C. The dyestuff suspension is then heated to 80° C. and the dyestuff is partly dissolved again by adding 13 to 26 parts of sodium hydroxide solution of 30% strength. The polyazo dyestuff is precipitated by salting out with 160 to 170 parts of sodium chloride at 80° C., filtered off, washed with sodium chloride solution of 5% strength, dried and ground. The resulting dark powder dyes cellulose fibres by an after-coppering method grey shades which are fast to light and wet treatments. The yield and the quality of the hexakisazo dyestuff are very good.

Coupling takes place even when no urea is added, but in this case the coupling mixture is considerably contaminated with by-products, and the pure dyestuff can be isolated only in a distinctly reduced yield.

100 parts of cotton are dyed according to the instructions given in Example 3. While still damp, the dyeing is introduced in a dye liquor containing in 3000 parts of water 3 parts of acetic acid of 100% strength and 2 parts of crystalline copper sulphate and treated in this liquor for 30 minutes at 70° C. The resulting after-coppered dyeing is fast to light and wet treatments.

Instead of 2 parts of crystalline copper sulphate there may be used with equal success 2 parts of the copper complex of the condensation products prepared from diethylenetetramine and dicyanodiamide as disclosed in German specification No. 855,001.

EXAMPLE 8

27.2 parts of 4,4'-diamino-1,1'-diphenyl-3,3'-dicarboxylic acid are dissolved in 240 parts of water and 29 parts of sodium hydroxide solution of 30% strength, a 40% solution of 14.5 parts of sodium nitrite is added, and the solution is poured within about 30 minutes into a mixture, maintained at 0° to 5° C., of 87 parts of hydrochloric acid of 30% strength, 20.5 parts of sodium naphthalene-2-sulphonate and 245 parts of ice. The batch is stirred for 30 minutes at 0° to 5° C. and mixed with 600 parts of urea and then with 108 parts of the monoazo compound of the formula

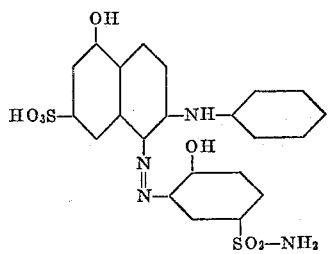

The mixture is stirred for 30 minutes at 0° to 5° C., and in the course of 1 hour 540 parts of an ammonia solution of 25% strength and then 130 parts of sodium hydroxide solution of 30% strength are added at 0° to 5° C. The coupling mixture is stirred for 2 hours at 0° to 5° C., heated to 80° C. and mixed with 40 parts of acetic acid of 50% strength; the pH value drops from about 9.2 to about 8.4. The precipitated dyestuff is filtered off, washed with a 1% solution of sodium tri-polyphosphate, then stirred for 30 minutes at 60° to 70° C. in 1% solution of sodium tri-polyphosphate, once more suctioned and washed with 1% sodium tri-polyphosphate solution. The dyestuff is dried at 100° C. under vacuum and then ground; it forms a dark powder which dyes cellulose fibres by an after-coppering method navy blue shades.

When the coupling is performed without adding urea, a considerable portion of the tetrazo compound decomposes; from this contaminated coupling mixture the polyazo dyestuff can be isolated only in a poor yield or in a poor quality.

EXAMPLE 9

A solution of 17.3 parts of 1-aminobenzene-4-sulphonic acid in 50 parts of water and 5.4 parts of calcined sodium carbonate is acidified with 30 parts of hydrochloric acid of 30% strength, whereupon a concentrated solution of 6.9 parts of sodium nitrite is added. The precipitated diazo compound is filtered off and added (as a 50% paste) at 0° to 10° C. to a mixture of 15 parts of 1-aminobenzene-2-carboxylic acid, 50 parts of urea, 30 parts of water and 1 part of hydrochloric acid of 30% strength, whereupon coupling sets in immediately. The batch is stirred for 3 hours at 0° to 10° C. and then overnight at room temperature. The dyestuff suspension is then buffered with 15 parts of crystalline sodium acetate, mixed with 75 parts of sodium chloride and filtered. After having been dissolved in and reprecipitated from dilute acetic acid, the dyestuff is isolated in the usual manner and dried. Yield: about 22 parts of dry dyestuff.

When the operation described above is repeated in the absence of urea, at best traces of the monazo dyestuff described are obtained.

EXAMPLE 10

27.2 parts of 4,4'-diamino-1,1'-diphenyl-3,3'-dicarboxylic acid are dissolved at 20° in a mixture of 660 parts of water and 28 parts of 30% sodium hydroxide solution. This solution is mixed with a solution of 13.8 parts of sodium nitrite in 50 parts of water. In about 10 minutes the combined solution is run with stirring into a solution of 113 parts of 30% hydrochloric acid and 400 parts of water maintained at 0°. Stirring is continued for about 2 hours until tetrazotisation is complete.

In the meantime 51.4 parts of 1-hydroxy-5-(2'-hydroxy-5' - aminosulphonyl - phenylazo)-6-phenylamino-naphthalene-3-sulphonic acid are dissolved at 20–25° in 420 parts of water and 27 parts of 30% sodium hydroxide solution.

To the strongly acid tetrazo suspension are then added 200 parts of urea and 53 parts of sodium naphthalene-2-sulphonate. It is stirred for about 5–10 minutes at 0–5° and in about 5 minutes the aforedescribed coupling solution is added with good cooling, followed over about 10 minutes by a solution of 90 parts of water-free sodium carbonate in 400 parts of water and 400 parts of ice. The unilateral coupling reaction takes place immediately and is complete after about 30 minutes at 0–5°. Subsequently a solution of 23.7 parts of 2-hydroxy-5-acetoacetylamino-benzene-1-carboxylic acid in 200 parts of water and 30 parts of 30% sodium hydroxide solution is run into the coupling mixture, the temperature being maintained at 0–5° by the addition of ice. The coupling mixture is stirred until the coupling reaction is complete, the temperature being maintained initially at 0–5° by adding ice and later allowed to rise to about 20–25°. The final volume is approximately 3500 parts by volume.

To precipitate the dye, 105 parts of 30% sodium hydroxide solution are added to the mixture, after which it is heated to 85° on which the dye goes into solution. The dye is salted out, filtered off with suction at 80°, washed with sodium chloride solution and dried. On grinding it is obtained as a dark powder which dyes cellulosic fibres black by an after-coppering dyeing process.

Without the addition of urea no usable dye is obtained.

EXAMPLE 11

300 parts of urea are dissolved in 100 parts of water at 50–55° and to the solution is added a suspension of 47.2 parts of the monoazo dye of formula

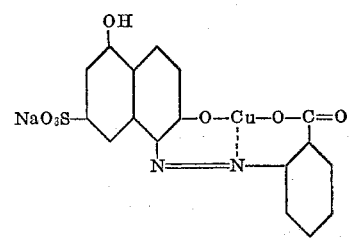

(in the form of the sodium salt) in 100 parts of water. The mixture is stirred until everything has gone into solution, on which it is cooled to 20° which causes the dye and part of the urea to settle out. After the addition of 36.5 parts of 25% ammonia solution, the weakly acid paste (about 150 parts) of the diazo compound of 55 parts of the disazo dye of formula

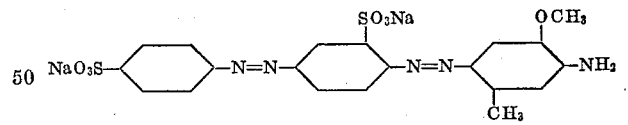

(in the form of the sodium salt) are added to the mixture of the coupling component at 20–25°. The initially brown-violet mixture soon changes to the deep blue-grey of the newly formed tetrakisazo dye. The mixture is stirred overnight at room temperature and the tetrakisazo dye is isolated in the usual way by dilution with water and salting out. It is obtained in good yield and quality.

Without urea no usable dye is obtained.

The amounts of urea present in the coupling mixtures of the foregoing examples are as follows:

| Example | Percentage of urea | |
|---|---|---|
| | Initial | Final |
| 1 | | 48 |
| 2 | 81 | 73 |
| 3 | 60 | 38 |
| 4 | 15.7 | 35.5 |
| 5 | 63 | 39 |
| 6 | 63 | 41 |
| 7 | 28 | 10.4 |
| 8 | 49 | 31.8 |
| 9 | 62 | 50 |
| 10 | 10.5 | 5.7 |
| 11 | 56 | 47.5 |

Having thus disclosed the invention, what we claim is:
1. A process for the manufacture of azo dyestuff from a coupling mass containing diazo compound, coupling component and urea, the amount of urea being from 2 to 80 percent by weight of the coupling mass.
2. A process according to claim 1 wherein the coupling mass is maintained at a temperature within the range of from 0° to 80° C.
3. A process according to claim 1 effected in a medium having a pH within a range from acid to alkaline.

References Cited

UNITED STATES PATENTS 2,891,047  6/1959  Suckfull et al. _____ 260—194 XR

OTHER REFERENCES

Houben-Weyl, "Methoden der Organischen Chemie," volume 10/3, page 265 (1965), QD 258.H7.

FLOYD D. HIGEL, *Primary Examiner.*